(12) United States Patent
Han et al.

(10) Patent No.: US 12,059,678 B2
(45) Date of Patent: Aug. 13, 2024

(54) MICROFLUIDIC DEVICE HAVING SEPARABLE STRUCTURE USING THIN FILM

(71) Applicant: INJE UNIVERSITY INDUSTRY-ACADEMIC COOPERATION FOUNDATION, Gimhae-si (KR)

(72) Inventors: Ki-Ho Han, Busan (KR); Jin-Ho Kim, Busan (KR)

(73) Assignee: INJE UNIVERSITY INDUSTRY—ACADEMIC COOPERATION FOUNDATION, Gimhae-si (KR)

(*) Notice: Subject to any disclaimer, the term of this patent is extended or adjusted under 35 U.S.C. 154(b) by 728 days.

(21) Appl. No.: 17/281,297

(22) PCT Filed: Nov. 19, 2019

(86) PCT No.: PCT/KR2019/015817
§ 371 (c)(1),
(2) Date: Mar. 30, 2021

(87) PCT Pub. No.: WO2020/106004
PCT Pub. Date: May 28, 2020

(65) Prior Publication Data
US 2021/0402393 A1 Dec. 30, 2021

(30) Foreign Application Priority Data

Nov. 19, 2018 (KR) .................. 10-2018-0142488

(51) Int. Cl.
*B01L 3/00* (2006.01)

(52) U.S. Cl.
CPC ... *B01L 3/502715* (2013.01); *B01L 3/502761* (2013.01); *B01L 2200/0652* (2013.01);
(Continued)

(58) Field of Classification Search
CPC ......... B01L 3/502715; B01L 3/502761; B01L 2200/0652; B01L 2300/0645;
(Continued)

(56) References Cited

U.S. PATENT DOCUMENTS

2005/0063865 A1* 3/2005 Bonne .................... B82Y 30/00
422/68.1
2009/0148933 A1* 6/2009 Battrell .................. C12Q 1/686
435/287.2

FOREIGN PATENT DOCUMENTS

KR 1-2005-0106408 A 11/2005
KR 10-2014-0067888 A 6/2014
(Continued)

OTHER PUBLICATIONS

KR20150058955A machine translation (Year: 2015).*
International Search Report for PCT/KR2019/015817, dated Mar. 13, 2020.

*Primary Examiner* — Jennifer Wecker
*Assistant Examiner* — Ali Husain Faraz
(74) *Attorney, Agent, or Firm* — Sughrue Mion, PLLC

(57) ABSTRACT

Provided is a microfluidic device including a lower panel including flow velocity measuring structures for measuring a flow velocity of a fluid; an upper panel separated from the lower panel and including a microfluidic channel through which a sample passes; a thin film provided at a portion where the lower panel and the upper panel adjoin each other in order to prevent the sample passing through the microfluidic channel from coming into direct contact with the flow velocity measuring structures, the thin film being configured to separate the lower panel and the upper panel to enable the lower panel to be repeatedly used multiple times; a specific functional unit configured to perform a specific operation on the sample passing through the microfluidic channel; and a
(Continued)

negative pressure forming means configured to suck the lower panel and the upper panel with a negative pressure.

13 Claims, 11 Drawing Sheets

(52) U.S. Cl.
CPC .............. *B01L 2300/0645* (2013.01); *B01L 2300/0816* (2013.01); *B01L 2300/0848* (2013.01); *B01L 2300/0861* (2013.01); *B01L 2300/0887* (2013.01); *B01L 2300/1827* (2013.01); *B01L 2400/043* (2013.01); *B01L 2400/0487* (2013.01)

(58) Field of Classification Search
CPC ..... B01L 2300/0816; B01L 2300/0848; B01L 2300/0861; B01L 2300/0887; B01L 2300/1827; B01L 2400/043; B01L 2400/0487; B01L 2200/143; B01L 3/502753; B01L 2300/1883; G01F 1/6845; G01F 1/6847
See application file for complete search history.

(56) References Cited

FOREIGN PATENT DOCUMENTS

| KR | 10-2015-0058955 A | 5/2015 |
| KR | 10-2017-0016900 A | 2/2017 |
| KR | 10-1852719 B1 | 4/2018 |

\* cited by examiner

[FIG 1]
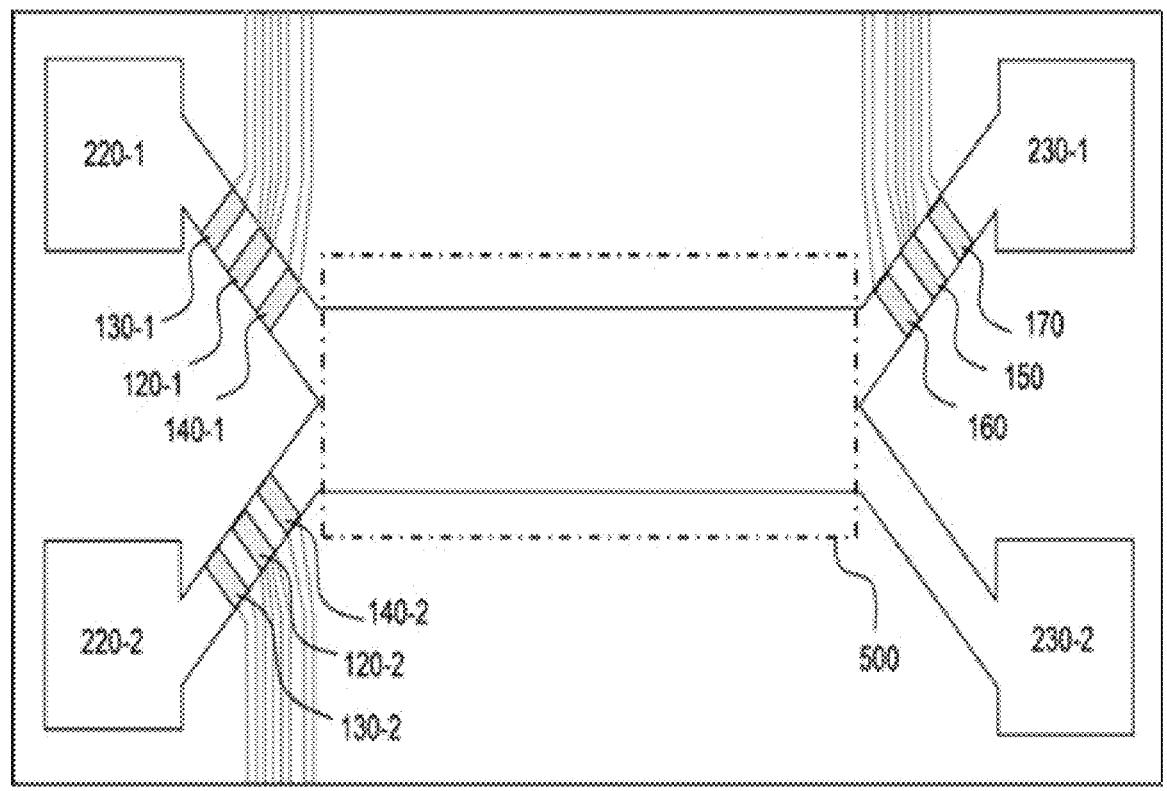

[FIG 2]
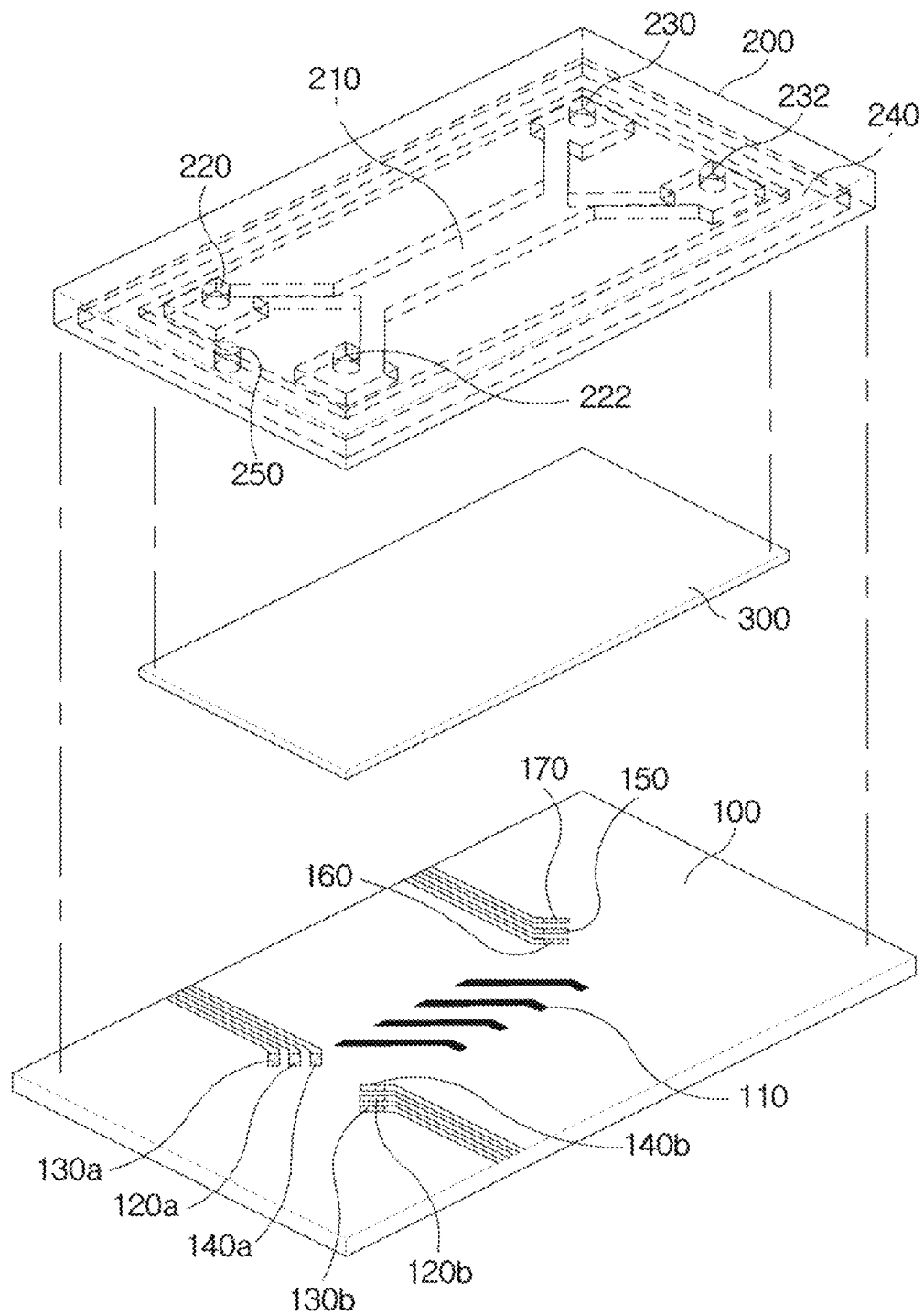

[FIG 3]
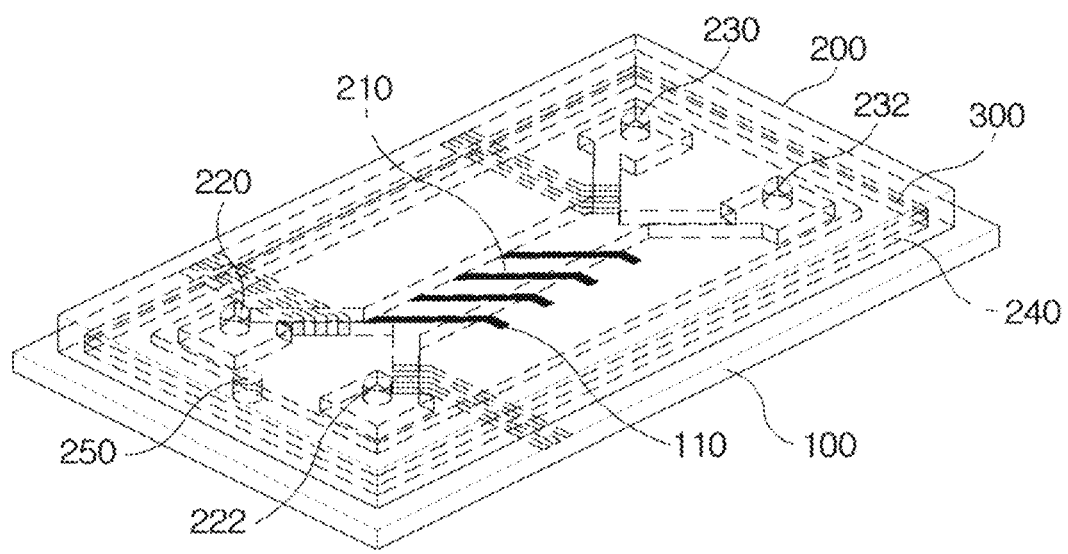
[FIG 4]
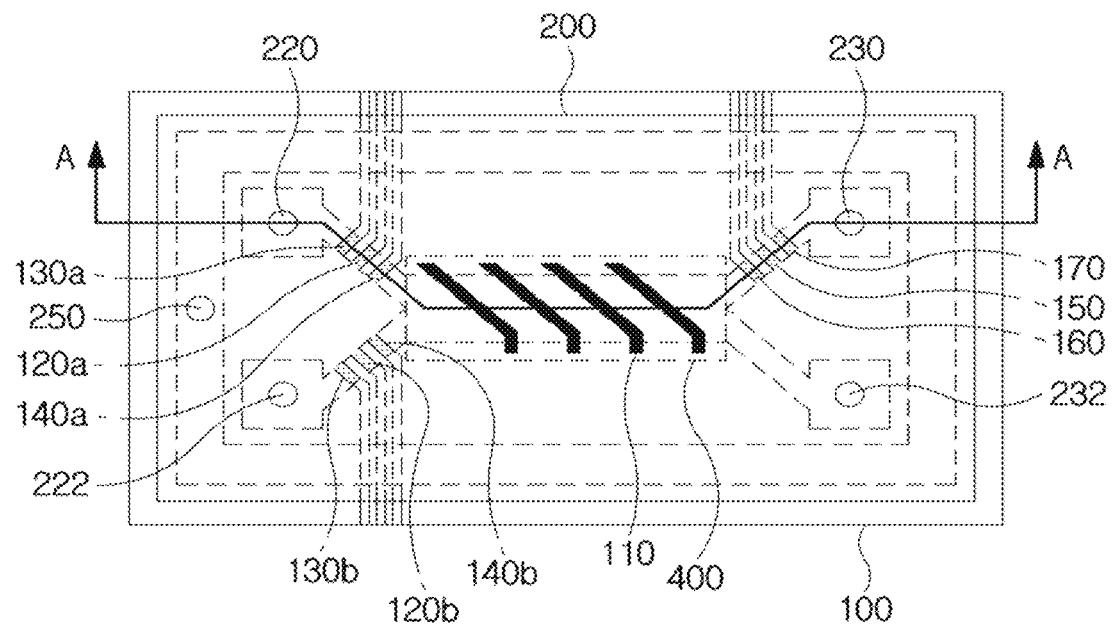

[FIG 5]
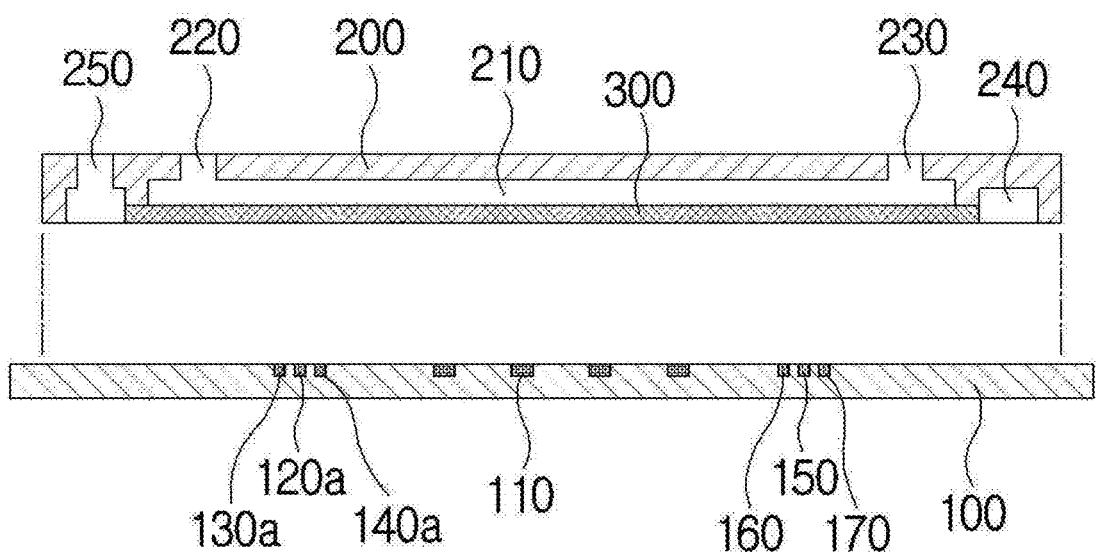
[FIG 6]
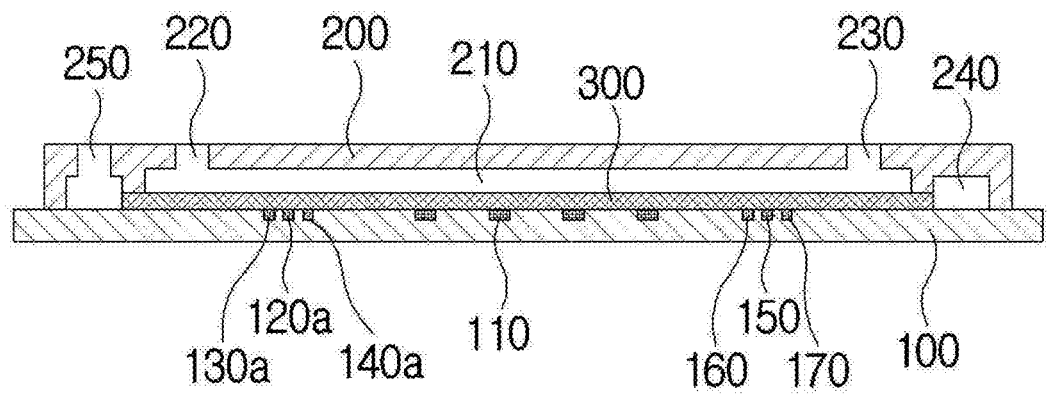

[FIG. 7]
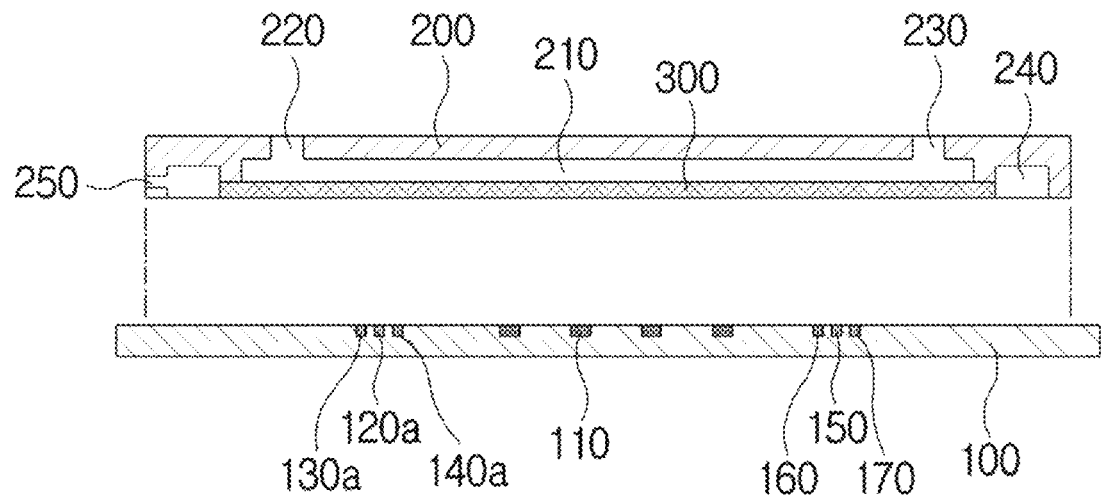
[FIG. 8]
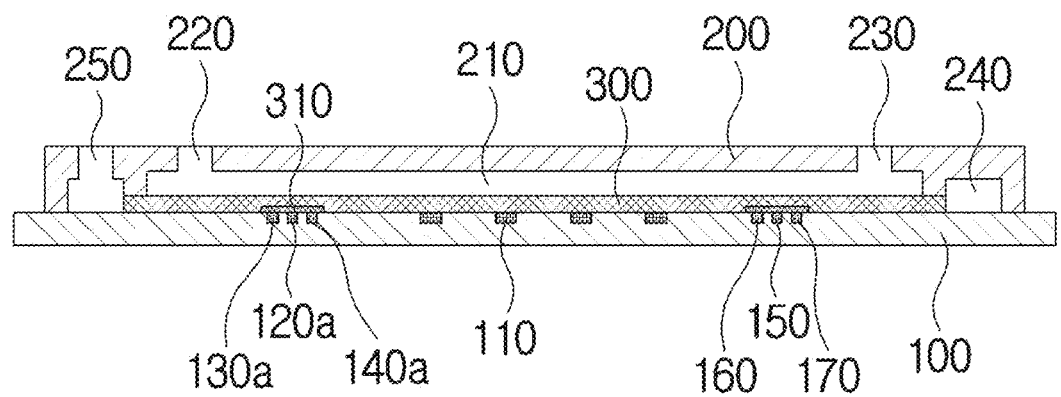

[FIG 9]
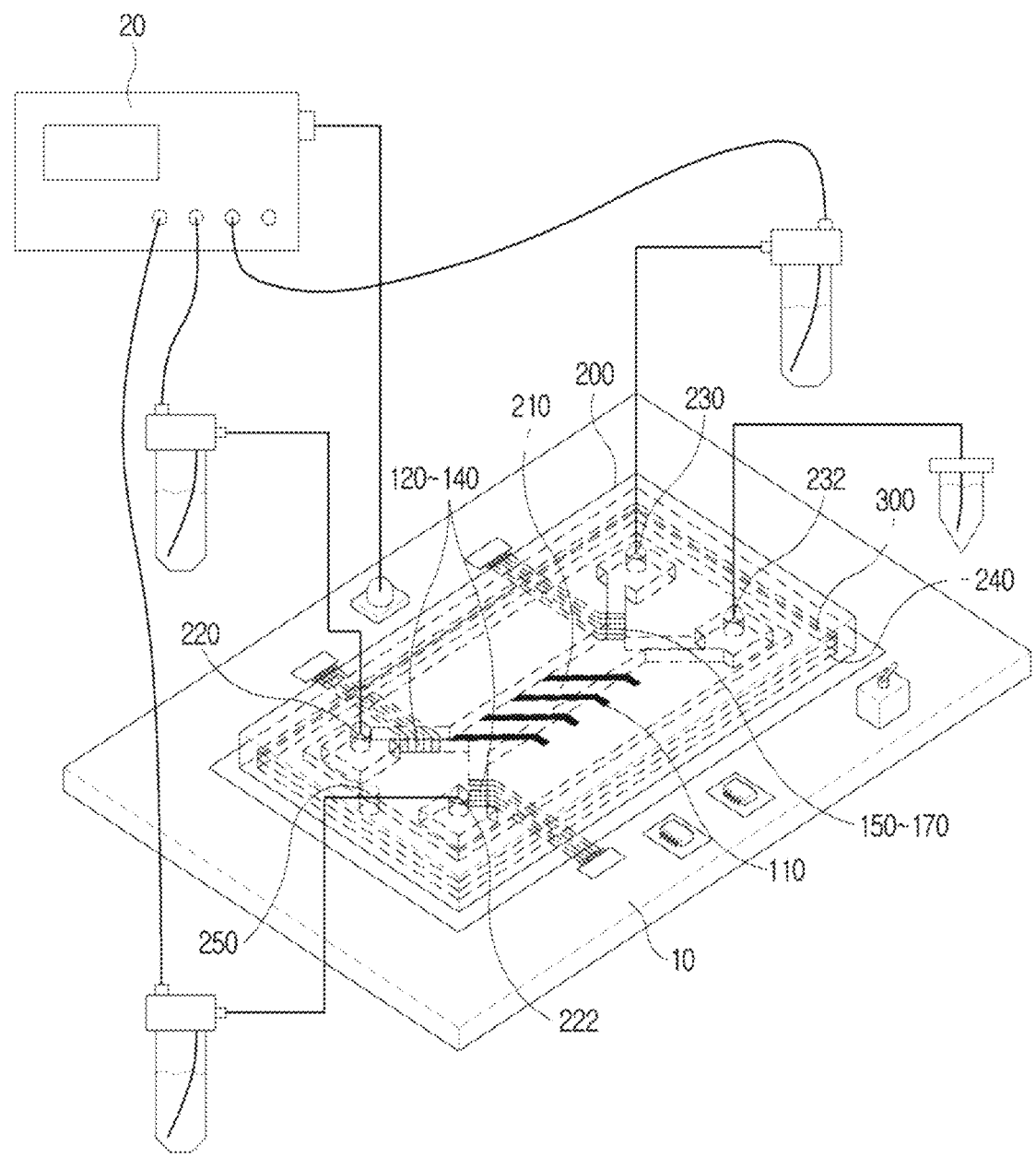

[FIG 10]
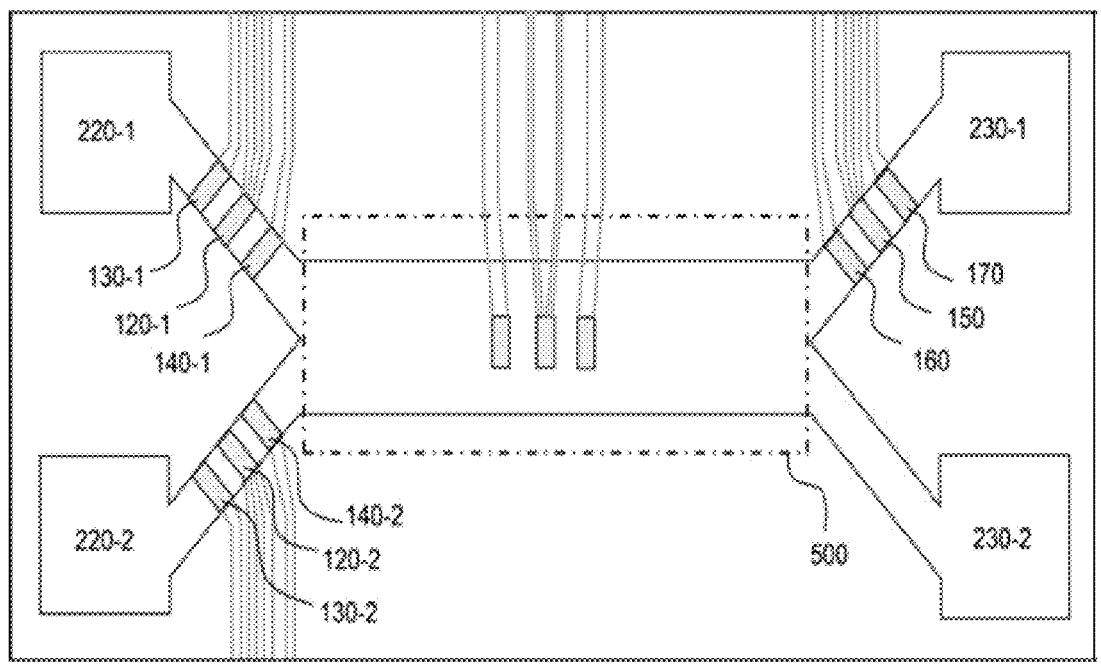
[FIG 11]
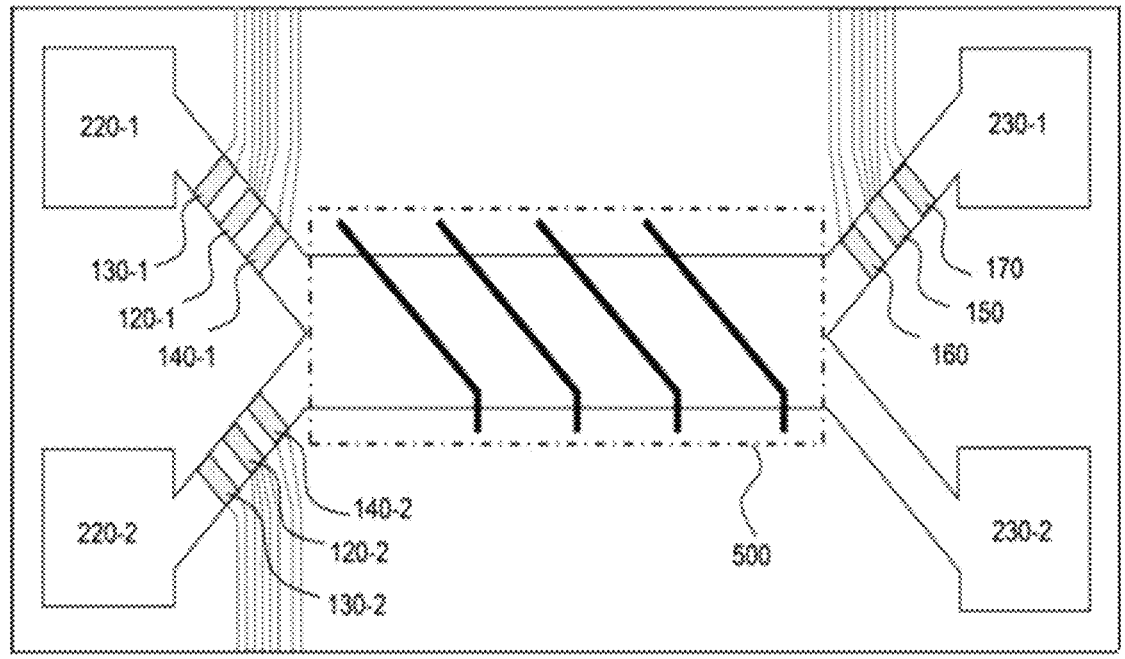

【FIG 12】
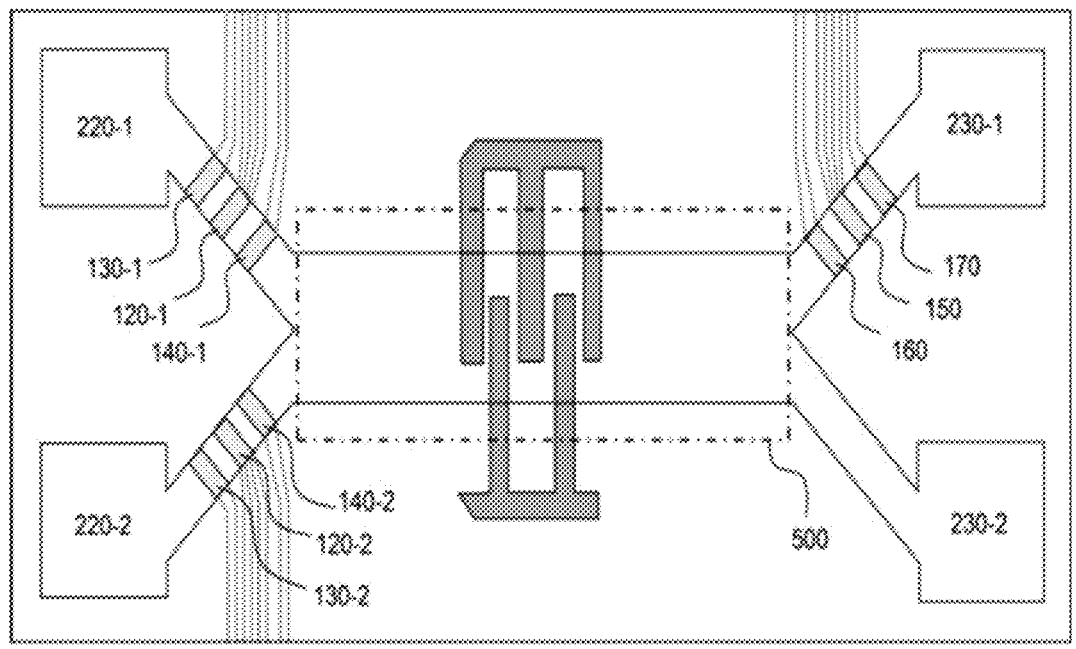
【FIG 13】
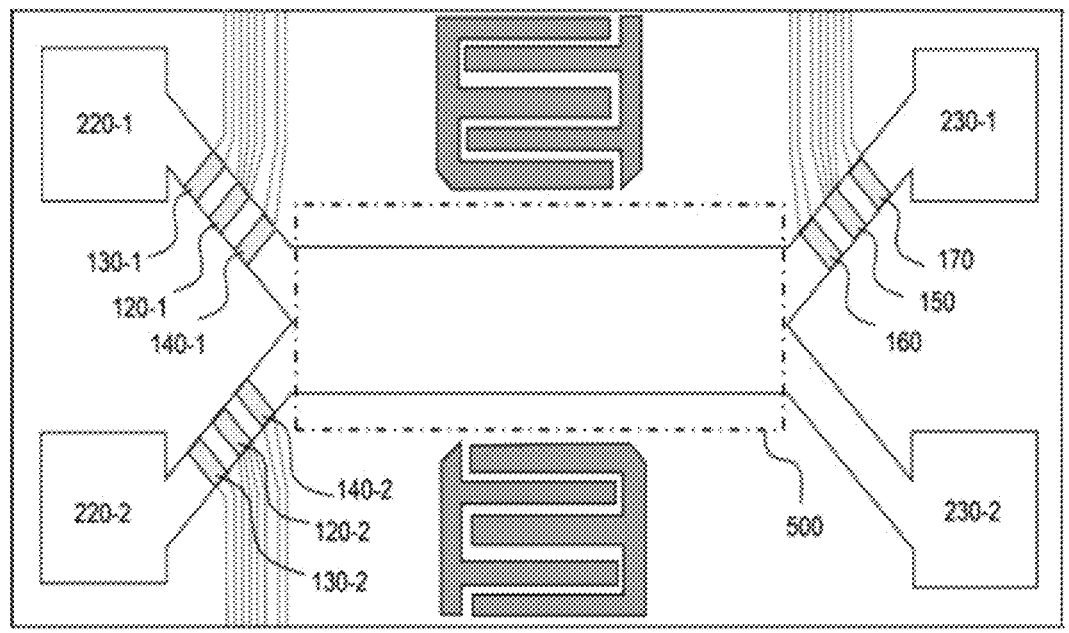

[FIG 14]
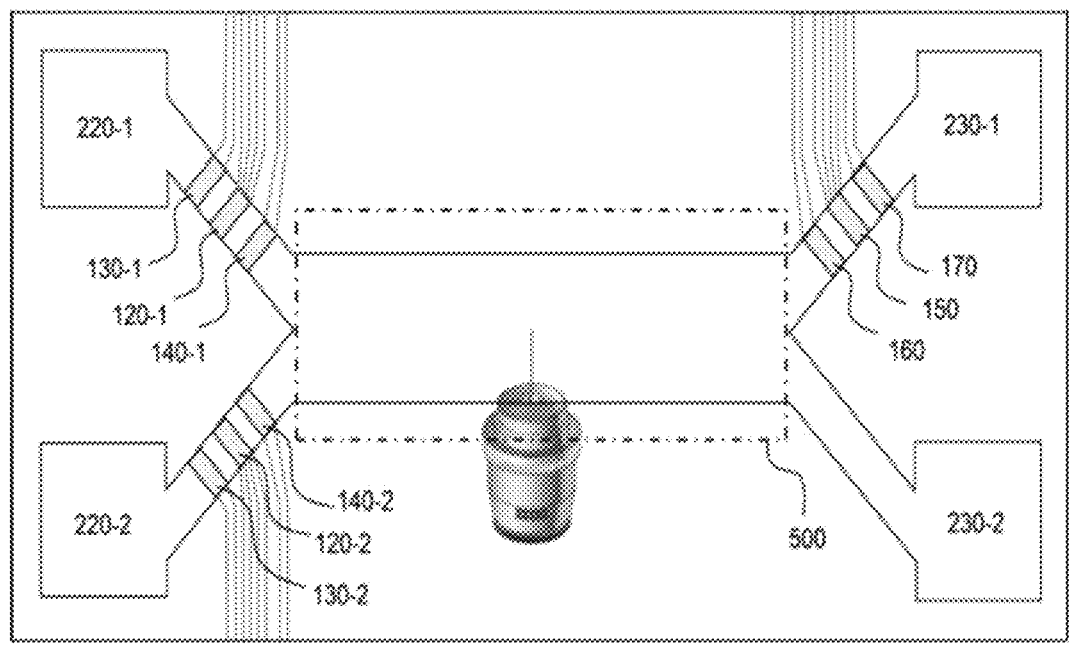
[FIG 15]
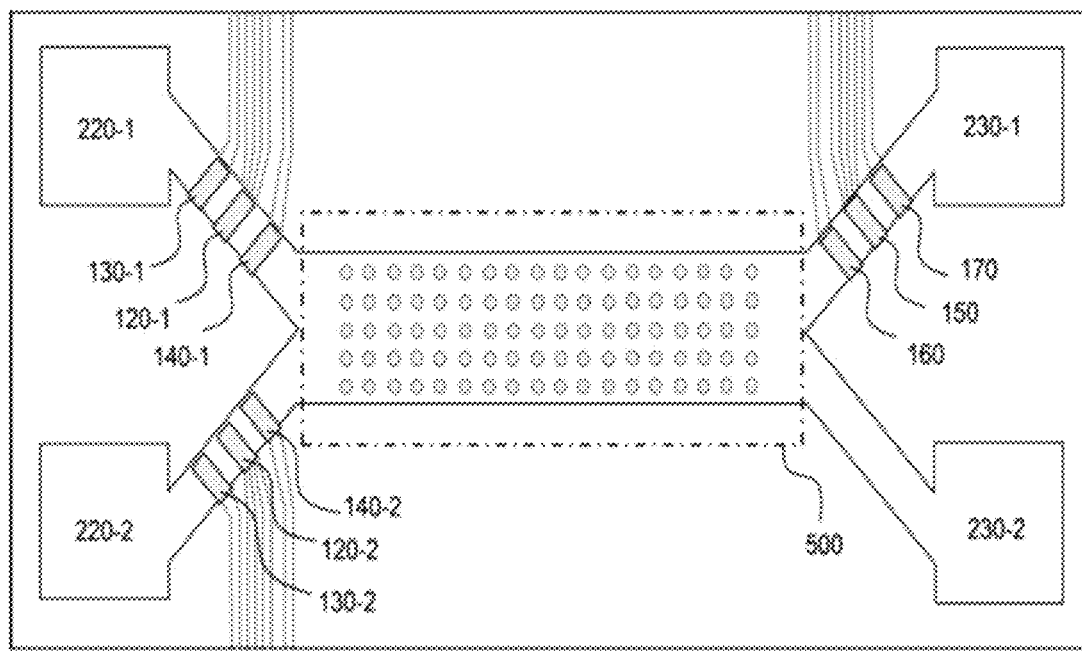

[FIG 16]
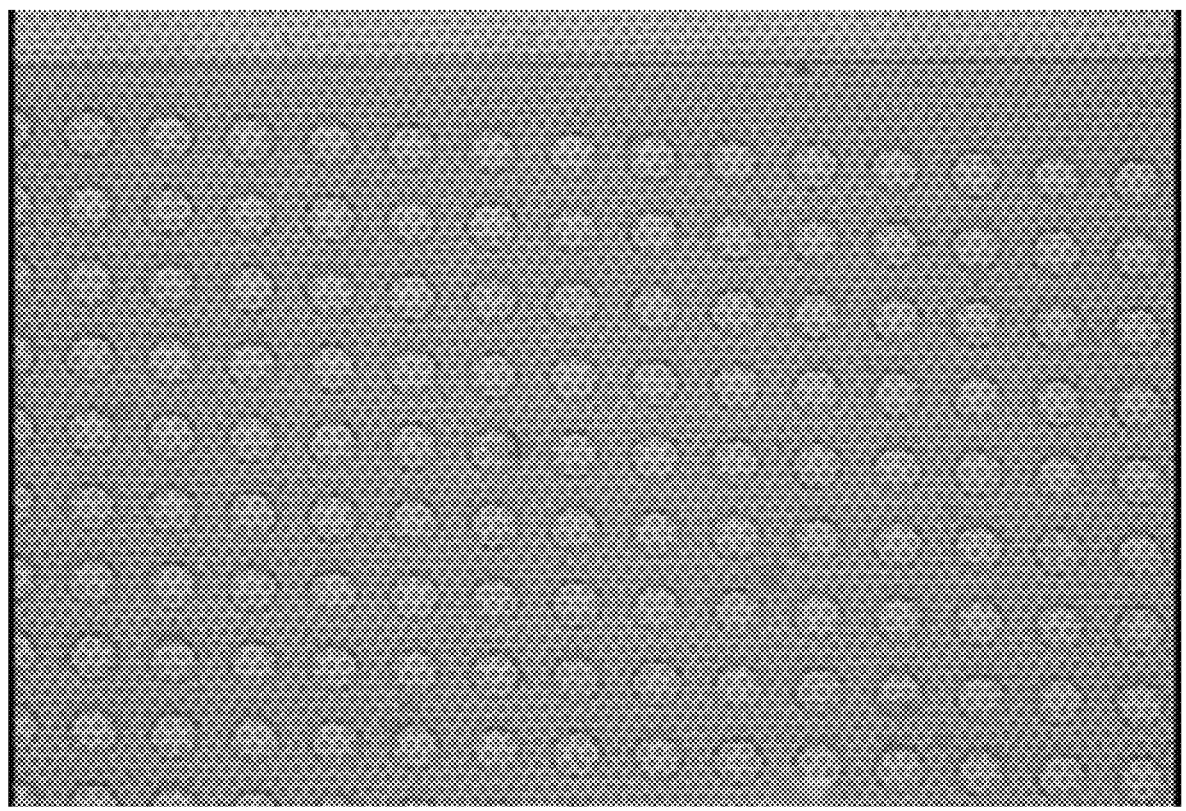
[FIG 17]
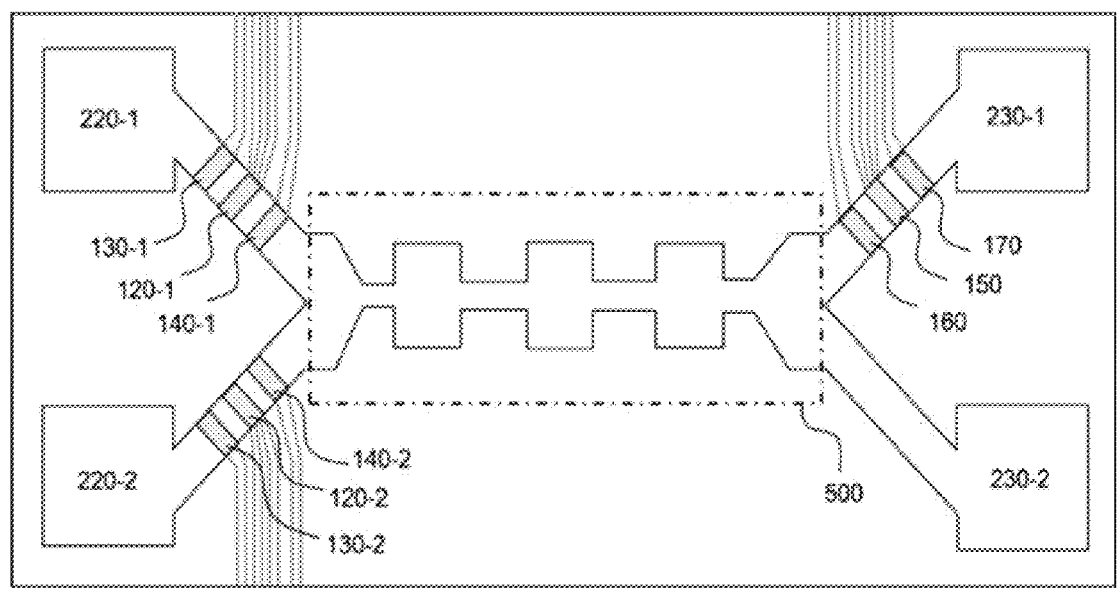

[FIG 18]
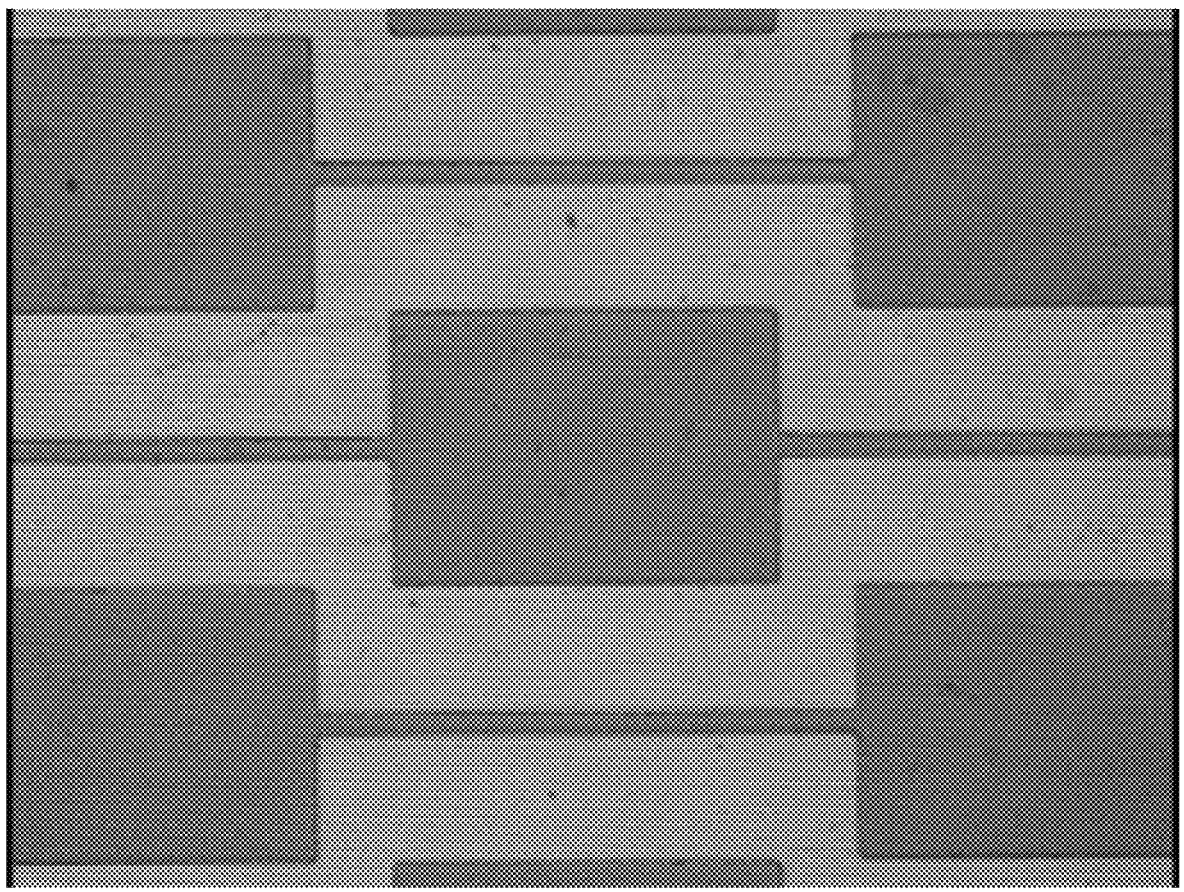

MICROFLUIDIC DEVICE HAVING SEPARABLE STRUCTURE USING THIN FILM

CROSS-REFERENCE TO RELATED APPLICATIONS

This application is a National Stage of International Application No. PCT/KR2019/015817 filed Nov. 19, 2019, claiming priority to Korean Patent Application No. 10-2018-0142488 filed Nov. 19, 2018, the entire disclosures of which are incorporated herein by reference.

TECHNICAL FIELD

The present invention relates to a microfluidic device having a separable structure using a thin film.

BACKGROUND ART

As a preparatory step for performing final purposes or other analyses, separation of cell types or intracellular components is required in the field of diagnosis, treatment, and research in the medical field.

Typically, as a method of separating a specific target biomolecule from a biological sample such as plasma, there have been known methods using silica, fiberglass, anion exchange resin, or magnetic beads.

According to the method using the magnetic bead, the magnetic bead having, on a surface thereof, a probe capable of being combined with the target biomolecule is introduced into a sample solution to capture the target biomolecule, and the magnetic bead is separated from the sample solution, thereby extracting the target biomolecule.

The method (bead-based separation method) of separating the target biomolecule using the magnetic bead in this manner has been already commercially available and widely used to separate cells, proteins, nucleic acids, or other biomolecules.

In the related art, in order to separate cells, a fluid pump is required to inject and discharge a sample into/from a microfluidic chip.

As the method for injecting the fluid in the related art, there is a method using a syringe pump or a pneumatic pressure to adjust a velocity of a fluid.

Because the syringe pump is easy to install and manipulate, the syringe pumps are currently used in many laboratories. However, the syringe pump slowly responds to a rapid change in flow velocity, a velocity of the fluid fluctuates due to a piston of a syringe, and the syringe pump does not consider a pressure in the microfluidic chip, which may cause the chip to burst.

Therefore, recently, a method of adjusting a velocity of a fluid using a pneumatic pressure is used to solve the abovementioned problem.

This method may be corrected in accordance with a condition in the microfluidic chip and may process a large volume of solution, unlike the syringe.

However, because information on the current flow velocity needs to be provided to adjust the pneumatic pressure, a flow velocity measuring device is always required.

For this reason, in the related art, a large space is required to perform an experiment because the flow velocity measuring device is needed as a separate device, together with a cell separating device.

Further, the cell separating device and the flow velocity measuring device are expensive and difficult to manufacture.

In particular, in the case of using a biological sample, the cell separating device and the flow velocity measuring device cannot be reused and need to be discarded after being used once, which causes a disadvantage in terms of costs.

DISCLOSURE

Technical Problem

An object of the present invention is to provide a microfluidic device, in which a cell separating structure for separating a cell or a fine particle in a fluid and a flow velocity measuring structure for measuring a flow velocity are included in a single panel, such that a flow velocity measuring device and a cell separating device in the related art are integrated into a single chip, thereby reducing size of the microfluidic device.

In addition, a panel through which a sample passes and a panel on which a flow velocity measuring structure and a cell separating structure are integrated are configured to be separated from each other by a thin film.

Another object of the present invention is to provide a microfluidic device, in which a panel on which structures are installed may be permanently used, and the structures are simple and thus easy to manufacture, thereby reducing manufacturing costs.

Technical Solution

A microfluidic device is introduced.

To this end, the microfluidic device according to the present invention includes: a lower panel including flow velocity measuring structures for measuring a flow velocity of a fluid; an upper panel separated from the lower panel and including a microfluidic channel through which a sample passes; a thin film provided at a portion where the lower panel and the upper panel adjoin each other in order to prevent the sample passing through the microfluidic channel from coming into direct contact with the flow velocity measuring structures, the thin film being configured to separate the lower panel and the upper panel to enable the lower panel to be repeatedly used multiple times; a specific functional unit configured to perform a specific operation on the sample passing through the microfluidic channel; and a negative pressure forming means configured to suck the lower panel and the upper panel with a negative pressure.

Advantageous Effects

According to the present invention, the flow velocity measuring structure and the cell separating structure may be integrated into the single lower panel, thereby reducing the size of the microfluidic device, and it is not necessary to provide the flow velocity measuring device and the cell separating device in the related art as separate devices, thereby simplifying the microfluidic device.

In addition, since the panel, which includes the cell separating structure and the flow velocity measuring structure, and the panel, through which the sample passes, are configured to be separated by the thin film, the sample does not come into direct contact with the measuring device, and as a result, the panel including the cell separating structure and the flow velocity measuring structure may be permanently used.

In addition, since the structure is simple and thus easy to manufacture, manufacturing costs are reduced in comparison with the fluid flow velocity measuring device in the related art.

In addition, since the panel including the flow velocity measuring structure may be used almost permanently, the microfluidic device is very advantageous in terms of costs in comparison with the related art.

In addition, since the panels are combined by the method of sucking the panels by applying negative pressure between the separated panels, it is possible to measure the flow velocity of the fluid with excellent and high performance.

DESCRIPTION OF DRAWINGS

FIG. 1 is a top plan view schematically illustrating a microfluidic device according to the present invention.

FIG. 2 is an exploded perspective view illustrating an entire configuration of a first exemplary embodiment of the microfluidic device according to the present invention.

FIG. 3 is an assembled perspective view illustrating the first exemplary embodiment of the microfluidic device according to the present invention.

FIG. 4 is a top plan view illustrating the first exemplary embodiment of the microfluidic device according to the present invention.

FIG. 5 is a cross-sectional view illustrating the first exemplary embodiment of the microfluidic device according to the present invention.

FIG. 6 is a cross-sectional view taken along line A-A in FIG. 4.

FIG. 7 is a cross-sectional view illustrating a second exemplary embodiment of the microfluidic device according to the present invention.

FIG. 8 is a cross-sectional view illustrating a third exemplary embodiment of the microfluidic device according to the present invention.

FIG. 9 is a perspective view illustrating an example in which the microfluidic device according to the present invention is installed.

FIG. 10 is a top plan view illustrating a fourth exemplary embodiment of the microfluidic device according to the present invention.

FIG. 11 is a top plan view illustrating a fifth exemplary embodiment of the microfluidic device according to the present invention.

FIG. 12 is a top plan view illustrating a sixth exemplary embodiment of the microfluidic device according to the present invention.

FIG. 13 is a top plan view illustrating a seventh exemplary embodiment of the microfluidic device according to the present invention.

FIG. 14 is a top plan view illustrating an eighth exemplary embodiment of the microfluidic device according to the present invention.

FIG. 15 is a top plan view illustrating a ninth exemplary embodiment of the microfluidic device according to the present invention.

FIG. 16 is a photograph of the exemplary embodiment illustrated in FIG. 15.

FIG. 17 is a top plan view illustrating a tenth exemplary embodiment of the microfluidic device according to the present invention.

FIG. 18 is a photograph of the exemplary embodiment illustrated in FIG. 17.

MODES OF THE INVENTION

A microfluidic device is introduced.

To this end, the microfluidic device according to the present invention includes: a lower panel including flow velocity measuring structures for measuring a flow velocity of a fluid; an upper panel separated from the lower panel and including a microfluidic channel through which a sample passes; a thin film provided at a portion where the lower panel and the upper panel adjoin each other in order to prevent the sample passing through the microfluidic channel from coming into direct contact with the flow velocity measuring structures, the thin film being configured to separate the lower panel and the upper panel to enable the lower panel to be repeatedly used multiple times; a specific functional unit configured to perform a specific operation on the sample passing through the microfluidic channel; and a negative pressure forming means configured to suck the lower panel and the upper panel with a negative pressure.

Mode for Invention

FIG. 1 is a top plan view schematically illustrating a microfluidic device according to the present invention.

The microfluidic device includes flow velocity measuring structures 130-1, 120-1, 140-1, 120-2, 130-2, 140-2, 150, 160, and 170 for measuring a flow velocity of a fluid, a microfluidic channel including injection parts 220-1 and 220-2 and discharge parts 230-1 and 230-2 for a sample or a buffer, and a specific functional unit 500 configured to perform a specific operation on the sample passing through the microfluidic channel.

The flow velocity measuring structures 130-1, 120-1, 140-1, 120-2, 130-2, 140-2, 150, 160, and 170 are positioned in the injection parts 220-1 and 220-2 and the discharge parts 230-1 and 230-2 of the microfluidic channel. The specific functional unit 500 is positioned at a middle portion of the microfluidic channel.

Therefore, the flow velocity measuring structures serve to measure a flow velocity based on which the specific functional unit 500 performs the specific operation.

In the present invention, the microfluidic device includes a cell separating structure for separating a cell or a fine particle in the fluid, as an exemplary embodiment of the specific functional unit 500.

FIG. 2 is an exploded perspective view illustrating an entire configuration of a first exemplary embodiment of the microfluidic device according to the present invention, FIG. 3 is an assembled perspective view illustrating the first exemplary embodiment of the microfluidic device according to the present invention, and FIG. 4 is a top plan view illustrating the first exemplary embodiment of the microfluidic device according to the present invention.

In addition, FIG. 5 is a cross-sectional view illustrating the first exemplary embodiment of the microfluidic device according to the present invention, and FIG. 6 is a cross-sectional view taken along line A-A in FIG. 4.

As illustrated in FIG. 2, the first exemplary embodiment of the microfluidic device according to the present invention broadly includes a lower panel 100, an upper panel 200 separated from the lower panel 100 and including a microfluidic channel 210 through which a sample passes, and a thin film 300 configured to separate the lower panel 100 and the upper panel 200.

In the present invention, the lower panel 100 includes the flow velocity measuring structures 120*a*, 120*b*, 130*a*, 130*b*, 140*a*, 140*b*, 150, 160, and 170 for measuring a flow velocity of the fluid, and a cell separating structure 110 for separating a cell or a fine particle.

That is, an object of the present invention is to provide a microfluidic device having a reduced size by integrating a flow velocity measuring device and a cell separating device in the related art into a single chip.

To this end, the lower panel 100 is characterized by being structured to include all the flow velocity measuring structures 120a, 120b, 130a, 130b, 140a, 140b, 150, 160, and 170 for measuring the flow velocity of the fluid and the cell separating structure 110 for separating the cell or the fine particle.

In this case, the flow velocity measuring structures 120a, 120b, 130a, 130b, 140a, 140b, 150, 160, and 170 and the cell separating structure 110 need to be formed at a position corresponding to the microfluidic channel 210 of the upper panel 200.

In addition, another feature of the present invention is that the thin film 300 is provided at a portion where the lower panel 100 and the upper panel 200 adjoin each other, and thin film 300 separates the upper panel 200, through which the sample passes, from the lower panel 100 and prevents the sample from coming into direct contact with the flow velocity measuring structures and the cell separating structure 110.

That is, in the related art, a one-piece structure is used, in which a heater or a flow velocity measuring sensor is coated with a material to prevent a sample from coming into direct contact with the heater for measuring a flow velocity, and the heater and the measuring sensor are integrated on the one-piece structure.

However, according to the present invention, the two panels are separated, and the thin film 300 is applied to the surfaces of the two separated panels to prevent the sample from coming into direct contact with the heater and the flow velocity measuring sensor, such that the lower panel 100 including the flow velocity measuring structures may be permanently used.

In this case, the thin film 300 may be formed to be thin so that a force such as heat or magnetic force, which may affect the cell or the fine particle passing through the microfluidic channel 210, may be transmitted well.

A material of the thin film 300 may include one or more materials selected from polydimethylsiloxane (PDMS), polyethylene terephthalate (PET), polyimide (PI), polypropylene (PP), polymeric plastic, glass, and ceramic.

Meanwhile, the upper panel 200 includes the microfluidic channel 210 through which the sample passes.

In this case, the microfluidic channel 210 may be divided into a microfluidic injection channel region including a plurality of injection parts into which the sample and the buffer are injected, a microfluidic separation channel region 210 through which the cell or the fine particle contained in the sample passes while being separated by magnetophoresis, and a microfluidic discharge channel region including a plurality of discharge parts 230 and 232 through which the remaining samples and the cell or the fine particle separated by passing through the microfluidic separation channel region 210 are discharged.

The plurality of injection parts in the microfluidic injection channel region includes a sample injection part 220 into which the sample containing the cell or the fine particle is injected, and a buffer injection part 222 into which the buffer is injected.

In some instances, the number of sample injection parts 220 and the number of buffer injection parts 222 may be two or more, but the present invention is not limited thereto.

As illustrated in FIG. 2, the sample injection part 220 and the buffer injection part 222 are separated such that the sample, containing the cell or the fine particle, and the buffer are individually injected into the sample injection part 220 and the buffer injection part 222, respectively.

The sample and the buffer, which are injected into the sample injection part 220 and the buffer injection part 222, respectively, are collected in the microfluidic separation channel region 210, the cell or the fine particle contained in the sample is separated while passing through the microfluidic separation channel region 210, and the cell or the fine particle is discharged through the plurality of discharge parts 230 and 232 in the microfluidic discharge channel region.

The fine particle, which may be separated in the microfluidic device according to the present invention, may be any fine particle that may be combined with magnetic particles such as DNA, antibodies, peptides, small peptides, and the like, and the fine particle particularly includes RNA or circulating tumor cells (CTCs).

The cell or the fine particle, which is separated while passing through the microfluidic separation channel region 210, is sent to any one discharge part 230 of the plurality of discharge parts in the microfluidic discharge channel region and collected in an external chamber, and the remaining samples are discharged through the separate discharge part 232 and collected in an external chamber.

In this case, the microfluidic channel 210 is formed in a lower surface of the upper panel 200, and the thin film 300 is attached to the lower surface of the upper panel 200 in order to enable the measurement of the flow velocity and the separation of the cell while preventing the sample passing through the microfluidic channel 210 from coming into direct contact with the flow velocity measuring structures 120a, 120b, 130a, 130b, 140a, 140b, 150, 160, and 170 and the cell separating structure 110 of the lower panel 100.

In this case, the thin film 300 needs to be sized to include the entire microfluidic channel 210.

Meanwhile, in order to separate the cell or the fine particle while the sample passes through the microfluidic separation channel region 210, the cell separating structure 110 is formed on the lower panel 100 and disposed at a position corresponding to the microfluidic separation channel region 210 of the upper panel 200.

The cell separating structure 110 may be configured to separate the cell or the fine particle by methods such as lateral magnetophoresis, dielectrophoresis, an acoustic method, laser manipulation, or deterministic lateral displacement (DLD).

In the present invention, a magnetic microstructure is applied as the cell separating structure 110, and the cell separating structure 110 separates the cell or the fine particle by a method of combining a magnetic particle with the cell or the fine particle in the fluid using magnetophoresis.

In this case, the method of combining the magnetic particle with the cell or the fine particle in the fluid is not particularly limited, and the magnetic particle may be combined with the cell or the fine particle by a method generally known in the art. In addition, the magnetic particle may be one or more oxides selected from a group consisting of cobalt, iron, manganese, zinc, nickel, and copper.

However, any material having magnetism may be used without limitation.

A surface of the magnetic particle is modified, and then the magnetic particle reacts with the fine particle to be separated, thereby fixing the fine particle to the surface of the magnetic particle.

To this end, the present invention requires an external magnetic field source (not illustrated) that generates a magnetic field around the cell separating structure 110.

Specifically, the cell separating structure 110 is configured as a magnetic microstructure patterned on the lower panel 100 by molding.

As illustrated in FIG. 2, the magnetic microstructure includes a plurality of linear structures, and the linear structures are formed at predetermined intervals.

In addition, the magnetic microstructure 110 is patterned on the lower panel 100 so as to have a predetermined inclination angle with respect to a flow direction of the sample in the microfluidic channel 210.

In the present invention, assuming that the inclination angle with respect to the flow direction of the sample in the magnetic microstructure 110 is $\theta$, the magnetic microstructure 110 may be patterned and included in the lower panel 100 such that $\theta$ changes in the microfluidic channel region.

For example, when the inclination angles $\theta$ of the magnetic microstructure with respect to the flow direction of the sample are sequentially $\theta 1$, $\theta 2$, ..., and $\theta n$ from the injection part to the discharge part of the microfluidic channel 210, values of $\theta 1$, $\theta 2$, ..., and $\theta n$ may gradually increase, and $\theta n$ is 90°.

In the present invention, as the magnetic microstructure, a ferromagnetic wire is manufactured and included in a substrate by a printed circuit process so as to have the angle $\theta$ with respect to the flow of the sample.

The fine particle, which is combined with the magnetic particle inputted into the sample injection part 220, passes, at an acute angle ($\theta$<90°), over the magnetic microstructure 110 included in the lower panel 100.

In this case, when an external magnetic field is applied, a high-gradient magnetic field is formed around the ferromagnetic wire which is the magnetic microstructure included in the lower panel 100.

Therefore, due to the influence of the high-gradient magnetic field, the magnetic force is applied, in a direction of the magnetic microstructure, to the fine particles combined with the magnetic particles placed around the wire, which is the magnetic microstructure, such that the fine particles are moved by force applied in a lateral direction of the magnetic microstructure.

That is, when no magnetic force is applied, only a drag force of the fluid is applied to both the fine particle having magnetism and the fine particle having no magnetism, and as a result, the fine particles are moved horizontally in a direction in which the fine particles are injected. However, when the magnetic force is applied, the fine particles, which are affected by the magnetic force, receive force in the lateral direction of the magnetic microstructure, such that the route of the fine particles is changed, and as a result, the fine particles having magnetism are separated from the fine particles having no magnetism.

In this case, depending on the fine particles to be separated, the cell separating structure 110 may change the inclination angle with respect to the flow direction of the sample, the thickness, an interval between the structures, the number of structures to be installed, a size of the external magnetic field source, and a flow velocity of the fluid in the microfluidic channel.

Meanwhile, the flow velocity measuring structures installed on the lower panel 100 include heaters 120a, 120b, and 150 configured to apply heat to the sample passing through the microfluidic channel 210, and two types of temperature measuring electrodes 130a, 130b, 140a, 140b, 160, and 170 installed at front and rear sides of the heaters 120a, 120b, and 150 to measure a resistance difference in accordance with a change in temperature of the sample when the temperature of the sample is increased by the heat generated by the heaters 120a, 120b, and 150.

That is, each of the first temperature measuring electrodes 130a, 130b, and 160 is installed at one side of each of the heaters 120a, 120b, and 150, and each of the second temperature measuring electrodes 140a, 140b, and 170 is installed at the other side of each of the heaters 120a, 120b, and 150.

The temperature measuring electrodes are installed at the front and rear sides of the heaters in the flow direction of the sample, respectively, and measure the resistance difference in accordance with the change in temperature of the sample when the temperature of the sample passing through the microfluidic channel 210 of the upper panel 200 is increased by the heat generated by the heater.

The flow velocity measuring structures are installed at the positions corresponding to the sample injection part 220 and the buffer injection part 222 of the microfluidic channel and the discharge part 230 of the chamber in which the separated cell or fine particle is collected.

It is possible to measure velocities of all fluids injected into and discharged from the upper panel 200, thereby adjusting performance of the cell separating structure 110.

In this case, the heaters and the temperature measuring electrodes on the lower panel 100 may have various structures and shapes.

The configuration is of course not limited to the structure illustrated in the drawings of the present invention as long as the configuration may measure the temperature of the sample.

Meanwhile, the present invention includes a negative pressure forming means for sucking the lower panel 100 and the upper panel 200 with a negative pressure.

The negative pressure forming means communicates with an air removing passageway 240 formed at a portion where the lower panel 100 and the upper panel 200 adjoin each other, and the negative pressure forming means applies the negative pressure to the air removing passageway 240.

The negative pressure forming means may have a negative pressure applying hole 250 through which an air layer between the lower panel and the upper panel is completely removed to suck the lower panel and the upper panel.

In this case, the air removing passageway 240 may be formed in the lower surface of the upper panel 200, and the negative pressure applying hole 250 may be formed to communicate with an upper surface or a lateral surface of the upper panel.

As illustrated in FIG. 2, the air removing passageway 240 is formed to have a shape and a position to surround the microfluidic channel 210.

That is, the air removing passageway 240 encompasses the entire region in which the injection parts 220 and 222 and the discharge parts 230 and 232 of the microfluidic channel 210 are formed. In particular, the air removing passageway 240 may be formed in a quadrangular shape.

The negative pressure applying hole 250 is connected to an external device to apply the negative pressure, thereby sucking the air in the air removing passageway 240.

The air layer between the lower panel 100 and the upper panel 200 is completely removed, such that the lower panel 100 and the upper panel 200 are sucked by a vacuum.

FIG. 5 is a cross-sectional view illustrating the first exemplary embodiment of the microfluidic device according to the present invention, and FIG. 6 is a cross-sectional view taken along line A-A in FIG. 4.

The air removing passageway 240 is formed in the lower surface of the upper panel 200, and the negative pressure applying hole 250 is formed to communicate with the upper surface of the upper panel 200, such that the air layer between the lower panel 100 and the upper panel 200 is completely removed through the negative pressure applying hole 250, and as a result, the lower panel 100 and the upper panel 200 are sucked by a vacuum.

FIG. 7 is a cross-sectional view illustrating a second exemplary embodiment of the microfluidic device according to the present invention.

The air removing passageway 240 is formed in the lower surface of the upper panel 200, and the negative pressure applying hole 250 is formed to communicate with the lateral surface of the upper panel 200.

As described above, the negative pressure applying hole 250 may be formed to communicate not only with the upper surface of the upper panel 200, but also with the lateral surface of the upper panel 200. The air removing passageway 240 may be formed not only in the upper panel 200, but also in the lower panel 100.

That is, the air removing passageway 240 is formed in the upper surface of the lower panel 100, and the negative pressure applying hole 250 is formed to communicate with the lower surface or the lateral surface of the lower panel 100, such that the air layer between the lower panel 100 and the upper panel 200 is completely removed through the negative pressure applying hole 250, and as a result, the lower panel 100 and the upper panel 200 may be sucked by a vacuum.

FIG. 8 is a cross-sectional view illustrating a third exemplary embodiment of the microfluidic device according to the present invention.

The thin film 300 according to the present invention may have a multilayered thin film structure including a plurality of layers.

In this case, the thin film 300 may have a multilayered thin film structure 310 formed at a position at which the flow velocity measuring structures 120a, 130a, 140a, 150, 160, and 170 adjoin one another.

This is to prevent the heat generated by the flow velocity measuring structures from being transferred directly to the thin film 300, and thus preventing the expansion of the thin film 300. The thin film 300 may have the multilayered thin film structure made of various materials.

For example, in a case in which the thin film 300 is a PDMS (polydimethylsiloxane) thin film, the heat for measuring the flow velocity may be generated by the heaters 120a, 120b, and 150 of the flow velocity measuring structures.

Because of the porosity of the PDMS thin film, there is a problem in that gas in the thin film may be expanded, the thin film may be expanded, and the fluid in the microfluidic channel 210 may permeate through the expanded thin film.

In this case, the multilayered thin film structure is applied in such a manner that a heat blocking film 310 is provided at the position at which the flow velocity measuring structures 120a, 130a, 140a, 150, 160, and 170 adjoin one another in order to prevent the heat generated by the heater from being transferred directly to the thin film 300, thereby solving the above-mentioned problem.

FIG. 9 is a perspective view illustrating an example in which the microfluidic device according to the present invention is installed.

The lower panel 100 including the flow velocity measuring structure and the cell separating structure 110 is installed on a signal processing circuit 10, and then the upper panel 200 having the microfluidic channel suitable for a user's purpose is installed to separate the cell or the fine particle.

After the upper panel 200 is attached to the lower panel 100, the negative pressure is applied by the negative pressure forming means, so that the lower panel 100 and the upper panel 200 are sucked by a vacuum.

The operation and effect of the microfluidic device having the separable structure using the thin film according to the present invention configured as described above will be described below.

As illustrated in FIG. 9, the lower panel 100 having the cell separating structure and the flow velocity measuring structures may be installed in a system, and then the upper panel 200 having the microfluidic channel having various structures in accordance with a measuring range of a flow velocity of a fluid that the user intends to measure may be installed to measure the flow velocity.

In this case, in the present invention, since the lower panel 100 and the upper panel 200 may be separated, the lower panel 100 may be used as it is installed in the flow velocity measuring system, and only the upper panel 200 may be replaced and used in accordance with the measuring range of the flow velocity of the fluid that the user intends to measure.

In addition, the present invention is not limited to the method of using the linear channel structure provided above the cell separating structure 110, and various methods may be used to separate the cell by installing the upper panel 200 having the fluid channel having various structures suitable for the user's purpose.

In addition, various exemplary embodiments may be applied to the specific functional unit 500.

FIGS. 10 to 18 are views illustrating various exemplary embodiments of the specific functional unit that may be broadly classified into [1] a method using external energy and [2] a method using a structure.

First, [1] as the method using external energy, there are methods using 1) heat transfer (FIG. 10), 2) lateral magnetophoresis (FIG. 11), 3) dielectrophoresis (FIG. 12), 4) acoustic (FIG. 13), and 5) laser manipulation (FIG. 14).

In addition, [2] as the method using a structure, there are methods using 1) deterministic lateral displacement (DLD) (FIGS. 15 and 16), and 2) vortex (FIGS. 17 and 18).

The DLD (deterministic lateral displacement) refers to a method of separating a cell or particle using a structure in a fluid chip by using a difference in size between cells or particles, and FIG. 16 is a photograph of the exemplary embodiment.

Meanwhile, the vortex refers to a method of separating a cell or a particle using a structure in a fluid chip by using a difference in size between cells or particles, and FIG. 18 is a photograph of the exemplary embodiment.

According to the present invention as described above, the panel including the cell separating structure and the flow velocity measuring structures may be repeatedly used multiple times, such that the panel may be used almost permanently.

The structure of the upper panel 200 is simple and thus easy to manufacture, and costs required to manufacture the upper panel 200 are low in comparison with the fluid flow velocity measuring device in the related art, and as a result, there is an advantage in terms of costs.

In addition, according to the present invention, the separated panels are combined by the vacuum coupling method that sucks the separated panels by applying the negative pressure between the separated panels, and as a result, it is possible to measure the flow velocity of the fluid with excellent and high performance.

In addition, the panel through which the sample passes may be replaced and used in accordance with the measuring range of the flow velocity of the fluid that the user intends to measure, and as a result, it is possible to universally use the panel without limiting a measurable range of the flow velocity.

The invention claimed is:

1. A microfluidic device comprising:
   a lower panel comprising flow velocity measuring structures configured for measuring a flow velocity of a fluid;
   a distinct upper panel separated from the lower panel and comprising a microfluidic channel through which a sample passes;
   a thin film disposed in between the lower panel and the upper panel, where the lower panel and the upper panel adjoin each other, and are configured to prevent the sample passing through the microfluidic channel from coming into direct contact with the flow velocity measuring structures, the thin film being configured to separate the lower panel and the upper panel and further configured to enable the lower panel to be repeatedly used multiple times;
   a specific functional unit configured to perform a specific operation on the sample passing through the microfluidic channel; and
   a negative pressure forming means configured to suck the lower panel and the upper panel with a negative pressure.

2. The microfluidic device of claim 1, wherein a cell separating structure for separating a cell or a fine particle in the fluid is further installed on the lower panel, and
   wherein the specific functional unit comprises an external magnetic field source configured to generate a magnetic field around the cell separating structure.

3. The microfluidic device of claim 1, wherein the microfluidic channel is divided into:
   a microfluidic injection channel region comprising a sample injection part into which the sample containing the cell or the fine particle is injected, and a buffer injection part into which a buffer is injected;
   a microfluidic separation channel region through which the cell or the fine particle contained in the sample passes while being separated; and
   a microfluidic discharge channel region comprising a chamber in which the cell or the fine particle separated while passing through the microfluidic separation channel region is collected, and a plurality of discharge parts through which the remaining samples are separated and discharged to the chamber in which the samples are collected.

4. The microfluidic device of claim 2, wherein the cell separating structure is configured as a magnetic microstructure patterned on the lower panel by molding.

5. The microfluidic device of claim 4, wherein depending on the fine particle to be separated, the cell separating structure changes an inclination angle with respect to a flow direction of the sample, a thickness, an interval between the structures, the number of structures to be installed, a size of the external magnetic field source, and a flow velocity of the fluid in the microfluidic channel.

6. The microfluidic device of claim 1, wherein the negative pressure forming means comprises:
   an air removing passageway formed at a portion where the lower panel and the upper panel adjoin each other; and
   a negative pressure applying hole configured to communicate with the air removing passageway and apply a negative pressure to completely remove an air layer between the lower panel and the upper panel and suck the lower panel and the upper panel.

7. The microfluidic device of claim 6, wherein the air removing passageway is formed in a lower surface of the upper panel, and the negative pressure applying hole is formed to communicate with an upper surface or a lateral surface of the upper panel.

8. The microfluidic device of claim 1, wherein a material of the thin film includes one or more materials selected from polydimethyl siloxane (PDMS), polyethylene terephthalate (PET), polyimide (PI), polypropylene (PP), polymeric plastic, glass, and ceramic.

9. The microfluidic device of claim 1, wherein the flow velocity measuring structure comprises:
   a heater configured to apply heat to the sample passing through the microfluidic channel; and
   two temperature measuring electrodes installed at front and rear sides of the heater to measure a resistance difference in accordance with a change in temperature of the sample when the temperature of the sample is increased by the heat generated by the heater.

10. The microfluidic device of claim 9, wherein the flow velocity measuring structures are installed at positions corresponding to a sample injection part and a buffer injection part of the microfluidic channel and a discharge part of a chamber in which a separated cell or fine particle is collected.

11. The microfluidic device of claim 1, wherein the thin film has a multilayered thin film structure having a plurality of layers.

12. The microfluidic device of claim 11, wherein the thin film has the multilayered thin film structure formed at a position at which the flow velocity measuring structures adjoin one another.

13. The microfluidic device of claim 12, wherein the thin film comprises a heat blocking film configured to prevent expansion of the thin film by preventing heat generated by the flow velocity measuring structure from being transferred directly to the thin film.

\* \* \* \* \*